United States Patent [19]
Mouri et al.
[11] 3,761,608
[45] Sept. 25, 1973

[54] PHASE DETECTOR

[75] Inventors: Katsuo Mouri, Yokohama; Gentaro Miyazaki, Fujisawa, both of Japan
[73] Assignee: Hitachi, Ltd., Tokyo, Japan

[22] Filed: June 22, 1971
[21] Appl. No.: 155,490

[30] Foreign Application Priority Data
June 24, 1970 Japan .............................. 45/54405

[52] U.S. Cl. ..................... 178/5.4 SY, 178/69.5 CB
[51] Int. Cl. ............................................. H04n 9/46
[58] Field of Search ................... 178/5.4 R, 5.4 SY, 178/69.5 CB

[56] References Cited
UNITED STATES PATENTS 3,585,285 6/1971 Rennick ........................ 178/5.4 SY
3,604,843 9/1971 Harwood et al. ........... 178/69.5 CB
3,604,845 9/1971 Cecchin et al. ............. 178/69.5 CB

*Primary Examiner*—Richard Murray
*Attorney*—Craig, Antonelli et al.

[57] ABSTRACT

A phase detector is disclosed, which is constructed such that a television signal including chrominance signal and color burst signal and a local color subcarrier signal are phase compared to each other by a differential amplifier of transistors. The emitter connected in common of the differential amplifier transistors are connected to a gating circuit, which is on-off controlled such that it is open only during the period of presence of the color burst signal in the television signal. A detection voltage according to the phase difference between the color burst signal and the color subcarrier signal appears at the collector of the transistor differential amplifier.

3 Claims, 5 Drawing Figures

PHASE DETECTOR

BACKGROUND OF THE INVENTION

1. Field of the Invention

This invention relates to the automatic phase control for color synchronizing circuits in color television receivers. More particularly, the invention concerns phase detectors for comparing the relative phases of the color burst signal and a color subcarrier signal from a local color subcarrier oscillator.

2. Description of the Prior Art

In color television receivers, the phase of the local color subcarrier oscillator oscillating at the color subcarrier frequency is automatically controlled in synchronism with the transmitted color subcarrier by detecting the phase difference between the oscillator output and the extracted color burst signal.

In the usual automatic phase control, the output of a color signal bandpass amplifier, that is, a television signal including chrominance signal and color burst signal, is fed to a color burst gating circuit to extract only the color burst signal, and the extracted color burst signal is phase compared with a 3.58-MHz signal from a local color subcarrier oscillator in a phase detector, which may consist of a pair of diodes, to thereby obtain the phase difference between the signals compared to each other.

However, in the usual automatic phase control as mentioned above, the phase detector and the color burst gating circuit should be provided separately, which is disadvantageous in the aspect of reducing the size of the over-all circuit. Also, to operate the conventional diode detector in a high detection sensitivity condition, the level of the color burst signal and the level of the reference signal, i.e., the output of the local color subcarrier oscillator, should be considerably high. For example, in the usual transistorized color television receiver about 6 $V_{p\text{-}p}$ is required for the level of the reference signal and about 15 $V_{p\text{-}p}$ for the level of the color burst signal. Therefore, it is extremely difficult to make an integrated circuit of said phase detector.

SUMMARY OF THE INVENTION

An object of the invention is to provide a phase detector, which has the function of extracting the color burst signal from the television signal as well as the function of detecting the phase difference between the extracted color burst signal and the reference signal.

Another object of the invention is to provide a phase detector, which is simple in circuit construction and satisfactorily operated with low levels of the color burst signal and reference signal, so that it is suited for integrated circuit.

According to the invention, the above objects are achieved by providing a transistor gate for extracting the color burst signal to a common emitter circuit of a transistor differential amplifier for phase comparing the color burst signal and reference signal.

These and other objects, features and advantages of the invention will become apparent from the following detailed description, when read in conjunction with the accompanying drawings.

DESCRIPTION OF THE PREFERRED EMBODIMENTS

Figure 1:
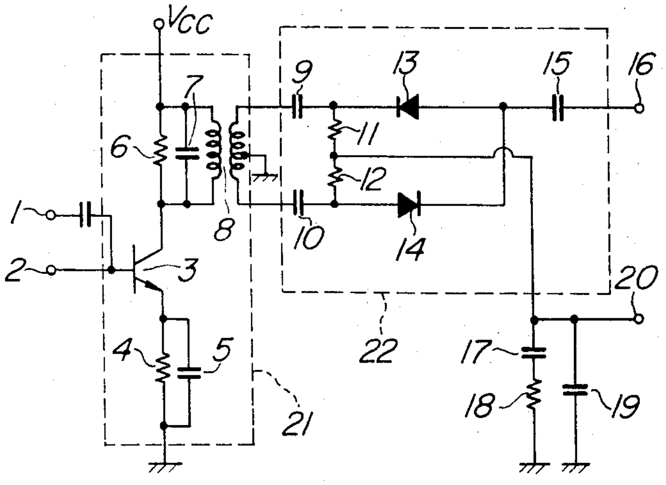
FIG. 1 PRIOR ART
FIG. 1 is a circuit diagram of a conventional phase detector circuit.

FIG. 1 shows a prior-art phase detector circuit. Referring to the Figure, reference numeral 21 designates a burst gate circuit, and numeral 22 a phase detector. A television signal including a chrominance signal and a color burst signal is impressed on an input terminal 1, and a gating pulse signal is impressed on an input terminal 2. The gating pulse signal is obtained by suitably delaying horizontal sync signal from a horizontal output transformer. It is synchronized to the color burst. The terminals 1 and 2 are connected to the base of a gating transistor 3, which has its emitter connected to a biasing resistor 4 in parallel with a bypassing capacitor 5 and its collector connected to a collector load resistor 6 in parallel with a smoothing capacitor 7. The gating transistor 3 performs on-off operations according to the gating pulse signal impressed at the terminal 2 to extract only the color burst signal from the television signal applied to the terminal 1. The color burst signal thus extracted and appearing across the load resistor 6 is coupled to a phase detector circuit 22 through a coupling transformer 8. It is fed through capacitors 9 and 10 across the circuit of series resistors 11 and 12.

Meanwhile, a local color subcarrier signal produced from a local color subcarrier oscillator (not shown) is impressed on a terminal 16 and coupled through a coupling capacitor 15 and diodes 13 and 14 connected in opposite polarities to each other across the circuit of series resistors 11 and 12.

A voltage, which appears between the connection point between the resistors 11 and 12 and ground and depends upon the phase difference between the extracted color burst signal and reinserted color subcarrier signal compared together, is taken out as the detection voltage. As the detection voltage appears across the series circuit of a capacitor 17 and a resistor 18, it is smoothed by a smoothing capacitor 19 and is made available at a terminal 20.

Figure 2:
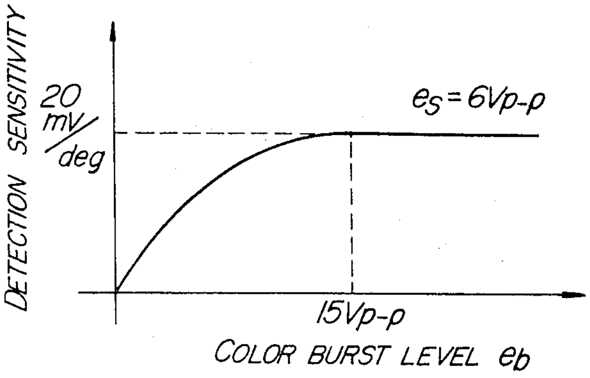
FIG. 2 shows a characteristic curve of detection sensitivity against burst signal level for the circuit of FIG. 1.

FIG. 2 shows a detection sensitivity characteristic of the prior-art detector described above with respect to the level $e_b$ of the color burst signal, obtained with a parameter $e_s$ which is the level of the reinserted color subcarrier wave. It will be seen from the Figure that, to obtain a detection sensitivity of 20 mV/deg it is necessary that $e_b = 15\ V_{p\text{-}p}$ and $e_s = 6\ V_{p\text{-}p}$. Therefore, integration of this circuit involves extreme technical difficulty. Also, since the extraction of the color burst signal and the phase detection are effected by separate circuits, a coupling transformer is required, which inevitably leads to a large size of the system.

The above drawbacks are overcome by the phase detector according to the invention.

Figure 3:
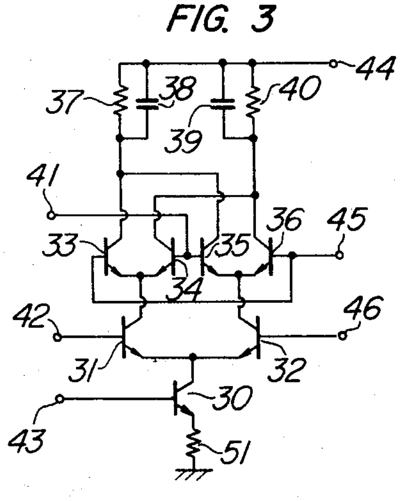
FIGS. 3 and 4 are circuit diagrams showing respective embodiments of the phase detector according to the invention.

FIG. 3 shows an embodiment of the invention. In this embodiment, a gating pulse signal, which is obtained by suitably delaying and shaping the horizontal sync output of a horizontal output transformer (not shown) and is appearing at a terminal 43, is impressed on the base of a gating transistor 30. The gating transistor 30 is rendered conductive during the presence of gating pulses at the terminal 43.

Transistors 31 and 32 constitute a differential amplifier and have their emitters connected in common to the collector of the gating transistor 30. A television signal including a chrominance signal and a color burst signal is impressed on a terminal 42 connected to the base of the transistor 31. A constant bias voltage is applied to a terminal 46 connected to the base of the transistor 32.

The gate 30 is controlled such that it is closed when the chrominance signal prevails at the terminal 42 and is open during the presence of the color burst signal, thus extracting the color burst signal and making it available between the collectors of the transistors 31 and 32.

Transistor pairs, respectively of transistors 33 and 34 and of transistors 35 and 36, constitute respective differential amplifiers. The transistors 34 and 35 in the respective pairs have their bases connected to a terminal 41. A color subcarrier signal produced from a local color subcarrier oscillator is impressed on the terminal 41. The other transistors 33 and 36 in the respective pairs have their bases connected to a terminal 45, which is held at a constant bias potential. The transistors 33 and 34 have their emitters connected in common, while the transistors 35 and 36 have their emitters connected in common. These common emitter connections are connected to the respective collectors of the transistors 31 and 32, at which collectors the extracted color burst signal appears. The collectors of the transistors 33 amd 35 are connected to a load resistor 37 in parallel with a smoothing capacitor 38, while the collectors of the transistors 34 and 36 are connected to a load resistor 40 in parallel with a smoothing capacitor 39. The load resistors are in turn connected to a terminal 44, to which an operating voltage is applied.

The differential amplifiers of the transistors 33 to 36 produce a signal in accordance with the phase difference between the extracted color burst signal and reinserted color subcarrier signal from the local color subcarrier oscillator. The signal thus produced and appearing across the loads is smoothed and taken as the detection signal. Numeral 51 designates a resistor for appropriately determining the magnitude of the gating current.

With this construction, the gating transistor 30 is conductive only during the presence of the gating pulses and is non-conductive otherwise, so that the transistors 33 to 36 do undertake the phase comparison between the color burst signal and the reference signal only during the burst gating period. Thus, this circuit has both the functions of gating the color burst and detecting the phase difference between the color burst and the reference signal.

Figure 5:
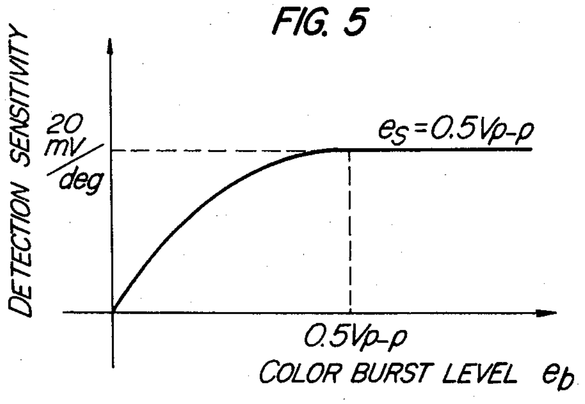
FIG. 5 shows a characteristic curve of detection sensitivity against burst signal level for the circuit of FIG. 3.

FIG. 5 shows the detection sensitivity of the circuit described above according to the invention. As is seen from the Figure, the color burst signal level $e_b$ and the reference signal $e_s$ required to obtain a detection sensitivity of 20 mV/deg are both about 0.5 $V_{p\text{-}p}$, being outstandingly reduced as compared with the conventionally required values. Thus, this circuit may be extremely readily integrated into an IC.

In the preceding embodiment of FIG. 3, it will be apparent that similar effects may be obtained by impressing the television signal including chrominance signal and color burst signal on the terminal 41 and the signal from the local color subcarrier oscillator (not shown) on the terminal 42. Also the transistors used are not limited to NPN transistors, but PNP transistors and field effect transistors may be used as well. Further, although in the preceding embodiment a fully balanced phase detector is constituted by the two differential amplifiers respectively of the transistors 33 and 34 and of the transistors 35 and 36, similar functions to those described above may be obtained with a half-balanced phase detector consisting of only one differential amplifier of, for instance, transistors 33 and 34. In such case, the collector of the transistor 32 is connected to an operating power source (not shown).

Figure 4:
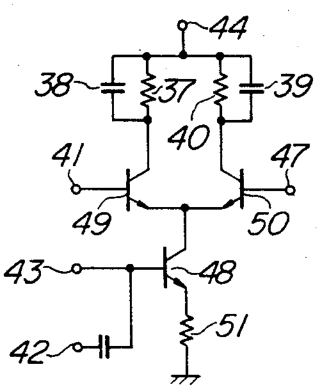

FIG. 4 shows another embodiment of the invention. In this embodiment, a differential amplifier of transistors 49 and 50 replaces the pair of differential amplifiers of the transistors 33 to 36 in the preceding embodiment of FIG. 3. The a-c components of television signal including chrominance signal and color burst signal and a gating pulse signal are impressed on the base of a transistor 48, and the output signal of a local color subcarrier oscillator is impressed on the base of the transistor 49. Similar to the embodiment of FIG. 3, in this embodiment it is possible to obtain the same effects by interchanging the television signal including chrominance signal and color burst signal and the local color subcarrier oscillator signal.

This embodiment uses only three transistors, so that the circuit construction is extremely simplified. Also, since the transistors are connected in two stages, the operating source voltage may be reduced.

We claim:

1. A phase detector comprising:

a differential amplifier including at least one pair of transistors having the emitters thereof connected in common, a color subcarrier signal to be phase compared with color burst signal being impressed on the base of one of said pair of transistors, the base of the other of said pair of transistors being held at a constant bias potential;

a transistir circuit on which a television signal including a chrominance signal and color burst signal, and gating pulses are impressed, said transistor circuit extracting only the color burst signal in said television signal to apply it to the common emitters of said pair of transistors; and a load circuit connected to the collectors of said transistors, said load circuit providing a detection output signal according to the phase difference between said color burst signal and said color subcarrier signal.

2. The phase detector according to claim 1, in which said differential amplifier comprises a first pair of differential amplifier transistors a second pair of differential amplifier transistors means to provide said color subcarrier signal to the base of one of said first pair of transistors and the base of one of said second pair of transistors, and means to provide said constant bias potential to the base of the other of said first pair of transistors and the base of the other of said second pair of transistors, and said transistor circuit comprises a third pair of differential amplifier transistors having the emitters thereof connected in common and the collectors thereof connected respectively to the common emitters of said first pair of transistors and the common emitters of said second pair of transistors, a gating transistor having the collector thereof connected to the common emitters of said third pair of transistors and the emitter thereof connected to ground means to provide said color burst signal to the base of one of said third pair of transistors, means to provide a constant bias potential to the base of the other of said third pair of transistors, and means to provide said gating pulses to the base of said gating transistor such that said gating transistor is rendered conductive only during the period of presence of the color burst signal in said television signal.

3. The phase detector according to claim 1, in which said transistor circuit comprises a gating transistor having the collector thereof connected to the common emitters of said pair of transistors and the emitter thereof connected to ground, means to provide said television signal including chrominance signal and color burst signal to the base of said gating transistor, and means to provide said gating pulses to the base of said gating transistor only during the period of presence of the color burst signal in said television signal.

* * * * *